(12) United States Patent
Tipper

(10) Patent No.: US 11,769,325 B2
(45) Date of Patent: Sep. 26, 2023

(54) DAZZLE RESILIENT VIDEO CAMERA OR VIDEO CAMERA MODULE

(71) Applicant: The Secretary of State for Defence, Salisbury (GB)

(72) Inventor: Sean Michael Tsi-Ong Tipper, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 82 days.

(21) Appl. No.: 17/442,467

(22) PCT Filed: Mar. 20, 2020

(86) PCT No.: PCT/GB2020/000032
§ 371 (c)(1),
(2) Date: Sep. 23, 2021

(87) PCT Pub. No.: WO2020/193931
PCT Pub. Date: Oct. 1, 2020

(65) Prior Publication Data
US 2022/0165049 A1    May 26, 2022

(30) Foreign Application Priority Data
Mar. 25, 2019   (GB) ..................... 1904072

(51) Int. Cl.
*G06V 20/40* (2022.01)
*G06V 10/56* (2022.01)
(Continued)

(52) U.S. Cl.
CPC .............. *G06V 20/40* (2022.01); *G06V 10/56* (2022.01); *H04N 23/80* (2023.01); *H04N 25/62* (2023.01)

(58) Field of Classification Search
CPC ........ G06V 20/40; G06V 10/56; H04N 23/80; H04N 25/62; H04N 23/10; H04N 9/68;
(Continued)

(56) References Cited

U.S. PATENT DOCUMENTS 5,387,933 A    2/1995 Fouilloy et al.
6,980,326 B2 *  12/2005 Tsuchiya ................. H04N 1/60
                                                    358/1.9
(Continued)

FOREIGN PATENT DOCUMENTS

GB      2464145 A       4/2010
WO   2014111676 A1     7/2014

OTHER PUBLICATIONS

Santos et al., "Visible and near-infrared laser dazzling of CCD and CMOS cameras," Proceeding of SPIE 10797, Technologies for Optical Countermeasures SV, Oct. 9, 2018, vol. 10797, pp. 107970S-1-107970S-9.

(Continued)

*Primary Examiner* — Michael S Osinski
(74) *Attorney, Agent, or Firm* — Kilpatrick Townsend & Stockton LLP

(57) ABSTRACT

Video camera or video camera module, comprising an RGB image sensor, a computer processor adapted to perform pre-processing followed by video compression, and a dazzle detector, characterised in responding to dazzle in one colour channel by reducing values in that colour channel prior to compressing the video data. This has the advantage that in the event of laser dazzle that is specific to a colour channel, the compressed video data generated will retain more detail from the other colour channels compared to a conventional camera.

9 Claims, 2 Drawing Sheets

(51) Int. Cl.
  *H04N 23/80* (2023.01)
  *H04N 25/62* (2023.01)
(58) Field of Classification Search
  CPC ........ H04N 23/00; H04N 23/81; H04N 23/76;
         H04N 19/186; H04N 23/71; H04N
         23/741; H04N 25/61; G02B 27/48; G02B
         27/0927; G06T 2207/10024; G06T 7/521;
         G06T 2207/10004; G06T 2207/10016;
         G06T 2207/10028; G06T 2207/20021;
         G06T 2207/20212; G06T 3/4015
  See application file for complete search history.

(56) References Cited

U.S. PATENT DOCUMENTS

| | | | | |
|---|---|---|---|---|
| 9,570,874 | B1* | 2/2017 | Ghauri | H01S 3/0092 |
| 9,916,518 | B2* | 3/2018 | Ueda | G06T 3/40 |
| 10,600,200 | B2* | 3/2020 | Roux | G06T 5/20 |
| 10,775,501 | B2* | 9/2020 | Bronstein | G01S 17/89 |
| 10,863,156 | B2* | 12/2020 | Talagala | G06T 5/007 |
| 10,929,960 | B2* | 2/2021 | Wilhelmsson | G06T 5/003 |
| 2004/0240747 | A1* | 12/2004 | Jarman | H04N 1/624 |
| | | | | 382/274 |
| 2005/0219552 | A1* | 10/2005 | Ackerman | G01B 11/2536 |
| | | | | 356/603 |
| 2008/0055426 | A1* | 3/2008 | Pertsel | H04N 23/76 |
| | | | | 348/222.1 |
| 2010/0007752 | A1* | 1/2010 | Myhrvold | H04N 23/74 |
| | | | | 348/222.1 |
| 2010/0110524 | A1* | 5/2010 | Gollier | G02B 27/48 |
| | | | | 359/279 |
| 2011/0085729 | A1* | 4/2011 | Shi | H04N 25/611 |
| | | | | 348/241 |
| 2011/0176028 | A1* | 7/2011 | Toyoda | H04N 23/73 |
| | | | | 382/274 |
| 2014/0002697 | A1* | 1/2014 | Tai | H04N 25/134 |
| | | | | 348/242 |
| 2015/0156382 | A1 | 6/2015 | Kuo et al. | |
| 2015/0332608 | A1* | 11/2015 | Williamson | G06T 3/4015 |
| | | | | 348/208.14 |
| 2017/0054989 | A1* | 2/2017 | Stessen | H04N 9/67 |
| 2017/0141847 | A1* | 5/2017 | De Bruijn | H04B 10/116 |
| 2018/0180408 | A1* | 6/2018 | Du | G01B 11/2545 |
| 2019/0089993 | A1* | 3/2019 | Hosoda | H04N 19/98 |
| 2019/0188874 | A1* | 6/2019 | Ge | G06V 10/145 |
| 2020/0134794 | A1* | 4/2020 | Chesnokov | G06T 5/006 |
| 2020/0150450 | A1* | 5/2020 | Wiersma | H04N 9/3126 |
| 2020/0175943 | A1* | 6/2020 | Li | G09G 5/02 |
| 2020/0288072 | A1* | 9/2020 | Seok | H04N 23/10 |
| 2022/0165049 | A1* | 5/2022 | Tipper | H04N 23/80 |

OTHER PUBLICATIONS

International Patent Application No. PCT/GB2020/000032, International Search Report and Written Opinion, dated May 18, 2020.
United Kingdom Patent Application No. 2004117.4, Combined Search and Examination Report, dated Sep. 9, 2020.
United Kingdom Patent Application No. 1904072.4, Search Report, dated Sep. 19, 2019.
Ritt Gunnar et al: "Preventing image information loss of imaging sensors in case of laser dazzle", Microfluidics, Biomems, and Medical Microsystems XI : Feb. 3-5, 2013. San Francisco, California, United States; [Part of SPIE Photonics West]; in: Proceedings of SPIE; ISSN 0277-786X; vol. 8615; [Proceedings of SPIE; ISSN 0277-786X; vol. 8615], vol. 10797, Oct. 9, 2018 (Oct. 9, 2018), XP060112478, DOI: 10.1117/12.2325307 ISBN: 978-1-5106-2099-5.
Ritt Gunnar et al: "Evaluation of protection measures against laser dazzling for imaging sensors", Proceedings of SPIE; [Proceedings of SPIE ISSN 0277-786X vol. 10524], SPIE, US, vol. 9989, Oct. 20, 2016 (Oct. 20, 2016), XP060080029, DOI: 10.1117/12.2241040 ISBN: 978-1-5106-1533-5.
Anonymous: "visible light—Does Bayer demosaicing from RGB-filter sensors work *because* the color filters are imprecise?—Physics Stack Exchange", Jun. 4, 2017 (Jun. 4, 2017), XP055692260.
International Patent Application No. PCT/GB2020/000032, International Preliminary Report on Patentability, dated Oct. 7, 2021, 10 pages.

* cited by examiner

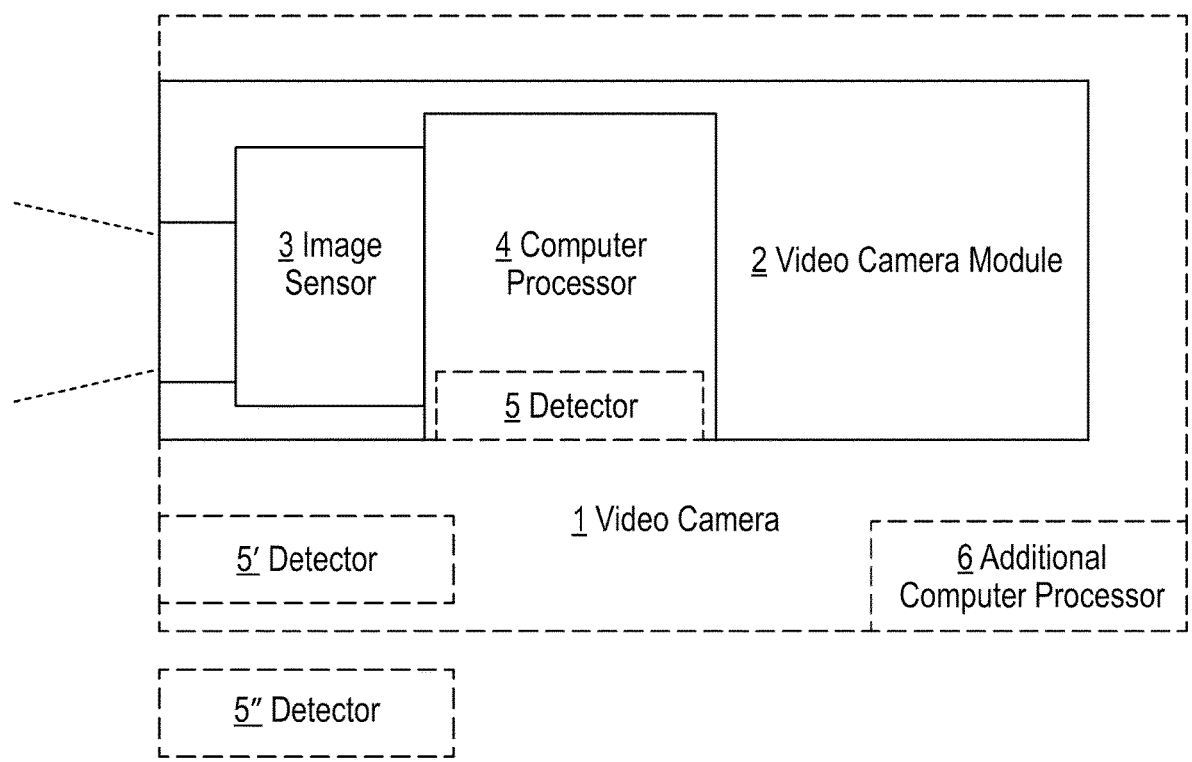

DAZZLE RESILIENT VIDEO CAMERA OR VIDEO CAMERA MODULE

The present invention relates to the field of laser dazzle, and is applicable to cameras designed to be resilient to laser dazzle. Laser dazzle is the phenomenon of a laser being aimed at an observer to cause temporary reduction or loss of visibility.

Laser dazzle is a well-known phenomenon and in the context of visible band cameras with the usual three colour channels (Red Green Blue commonly abbreviated to RGB) it can be dangerous. For example a camera may be used to detect approaching threats, however if dazzled by a laser it might no longer be possible to locate those approaching threats. Whilst military dazzle lasers may have multiple wavelengths/colours there are also threats from civilians using laser pointers, for example aiming them at helicopters and other aircraft or at police cars, and these lasers generally are a single wavelength and usually will mostly affect only one of the three colour channels in an RGB camera.

A number of methods have been proposed to tackle laser dazzle, such as colour filters, frequency notch filters, etc. These usually have some detrimental effect on image quality although in most cases this can be limited by only activating the filter or moving it in front of the camera when needed.

It is an object of the present invention to provide an alternative approach to reducing how much image quality is lost in an RGB camera that is periodically subject to laser dazzle.

An aspect of the present invention is set out in claim 1. This has the advantage of reducing the loss of image quality caused by laser dazzle in at least some circumstances, as compared to a conventional camera.

When video data is taken from a video camera chip, in compressed form, the dazzled channel (E.g. red) could be zeroed out (all values changed to zero) leaving only the un-dazzled channels, which in principle would be expected to largely mitigate the effects of the laser dazzle. However with this approach the image quality was found to be lower than when RAW data was taken from the video camera chip, the dazzled channel zeroed out, and then the video data compressed.

Further investigation has revealed that the reduction in image quality in those non-dazzled channels is due to the use of conventional compression algorithms which compress video data so as to preserve intensity variations more accurately than colour variations. Compression algorithms are optimized in that fashion because the human eye is more sensitive to intensity variations than to colour variations. In the situation that one channel is dazzled (E.g. red), due to the high intensity in that channel any small variations in the other channels will not be accurately expressed in the compressed video data since they represent only extremely small intensity variations, and also quite small colour variations.

Accordingly it is proposed that the camera should detect high values (and/or extremely bright spot) in any one channel (or ideally in any one or two channels) consistent with laser dazzle caused by a collimated laser at wavelength(s) that is/are restricted to one (or optionally up to two) of the RGB channels of the camera.

In 'normal' mode (i.e. any mode other than 'dazzle' mode) the camera performs any typical pre-processing steps such as de-mosaicking, white balancing etc, prior to compressing the video data. However upon detecting such values consistent with such laser dazzle, the camera should change mode from 'normal' mode to 'laser dazzle' mode, in which the values in the dazzled channel(s) are reduced prior to compression by the compression algorithm. The reduction should be very strong reduction, specifically at least a reduction of 50%, optionally at least 75%, preferably at least 90% optionally 100%. Optionally/additionally the dazzled channel(s) values are reduced to be no higher than to the non-dazzled channel(s) (e.g. based on mean or median average value across the field of view in each frame).

Accordingly the camera benefits from strong data compression under normal circumstances without particular loss of image quality, but when the camera is subject to laser dazzle in one colour channel, there is less loss of image quality in the other colour channels than would be the case with a conventional camera.

A video camera module is a component of a typical video camera, comprising an image sensor, and computer processor adapted to perform pre-processing tasks, a data output port typically in the form of a ribbon cable (typically only suitable to transmit data a distance of a few inches), and usually a lens, but does not contain significant non-volatile memory such as an SD Card™, nor a screen, input buttons, nor additional output ports for different formats of data such as HDMI™, Ethernet™ etc, nor a battery. Most video camera modules output raw data, but some are capable of outputting compressed data. A video camera module is an electronic component that generally is included as part of a wider system, such as a mobile phone, a CCTV camera unit, or consumer camera.

By contrast the term video camera is intended to mean a unit which includes a video camera module as well as other components necessary to form a commercial product, typically either a screen and buttons or a data port suitable for long distance transmission (e.g. Ethernet™ or RS232™), additional computer processor, and either a battery housing or a voltage converter. Additionally a video camera generally comprises a housing in which the video camera module is situated, with a port hole or window for the video camera to receive light through.

The detector can advantageously be comprised in a video camera module (for example provided by adapting the computer processor to detect values in the video data collected by the image sensor), however it equally may be another component of a video camera.

Generally, a detection of dazzle (e.g. laser dazzle) is made repeatedly, e.g. from the raw data for each video frame. Whilst such dazzle is detected the computer processor reduces the relevant colour channel prior to video data compression, however when such dazzle is no longer detected, the camera/module reverts to normal operation.

PREFERRED EMBODIMENTS

Optionally the detector is not only adapted to determine an excess of light in one RGB colour channel compared to the other two, but also adapted to determine an excess of light in two RGB colour channels compared to the other one. This has the advantage offering protection from some limited types of multi-wavelength lasers (and some single wavelength lasers with a wavelength that is at the boundary of two colour channels).

Optionally the detector is adapted to determine the excess of light based on video data from the RGB sensor. This is preferable over utilizing a separate detector because it can be readily implemented without additional hardware components.

Optionally in reducing values of the specified RGB colour channel(s) as part of the at least one pre-processing step, the computer processor is adapted to reduce the values by at least 50% of their original values on average(mean) across at least part of the field of view of the video camera or video camera module, preferably by at least 75%, optionally by at least 90%. Optionally in reducing values of the specified RGB colour channel(s) as part of the at least one pre-processing step, the computer processor is adapted to reduce each value by at least 50% of their original value, across at least part of the field of view of the video camera, preferably by at least 75%, optionally by at least 90%. A strong reduction in the values is important in order to ensure that the compression algorithm encodes small variations in the weaker colour channels.

Optionally in reducing values of the specified RGB colour channel(s) as part of the at least one pre-processing step, the computer processor is adapted to apply a high frequency band pass filter to the specified RGB colour channels, across at least part of the field of view of the video camera or video camera module. This has the advantage of facilitating a strong reduction in the highest values near to and at the laser dazzle spot where the values can be expected to be highest, whilst retaining variations in intensity and colour, thus promoting better image quality in all three colour channels.

Optionally the detector is adapted to identify a part of the field of view of the camera in which there is an excess of light in at least on one RGB colour channel compared to the other RGB colour channel(s), that is consistent with laser dazzle from at least one type of laser, and to output to the computer processor an indication of the part of the field of view, and; in reducing values of the specified RGB colour channel(s) as part of the at least one pre-processing step the computer processor is adapted to reduce values of the specified RGB colour channel(s) at least preferentially in the indicated part of the field of view. This has the advantage of enabling adjustments in the region of the field of view where necessary without affecting other regions that do not need to be adjusted. Such a part/region is typically a rectangular defined sub-set of the field of view, but may be any other shape, such as a circle.

The bayer filter of the image sensor is a filter layer which provides a reduction in sensitivity (i.e. blocks light) for each sensor element in the array regarding the other colour channels. So, for example a red image sensor element is covered by part of the bayer filter such as to reduce the sensitivity of that image sensor element to green and blue light. In conventional cameras the amount of reduction in sensitivity provided to any image sensor element by the bayer filter for the other two colour channels is at best an optical density (OD) of about 2 (OD2). Optical density is measured here as an average (mean) value across the colour channel. Optical density is the base 10 logarithmic ratio of the input and output intensity of light that a filter produces.

To promote improved image quality in the event of laser dazzle within a single colour band, it is preferred for the bayer pattern to provide an optical density of at least OD3, more preferably at least OD4, and optionally at least OD6. This can be as a minimum that for each image sensor element, this applies for at least one of the other colour channels but much more preferably it applies for both other colour channels.

A bayer pattern filter with greater optical density can be achieved by applying a thicker bayer pattern filter. Similarly, stacking two convention OD2 bayer pattern filters on top of one another results in a composite bayer pattern filter offering approximately OD4, provided that the patterns are aligned with each other.

A detailed embodiment of the invention will now be described by way of example, and with reference to the figures in which:

FIG. 4 shows a block diagram of an embodiment of the invention.

Figure 1:
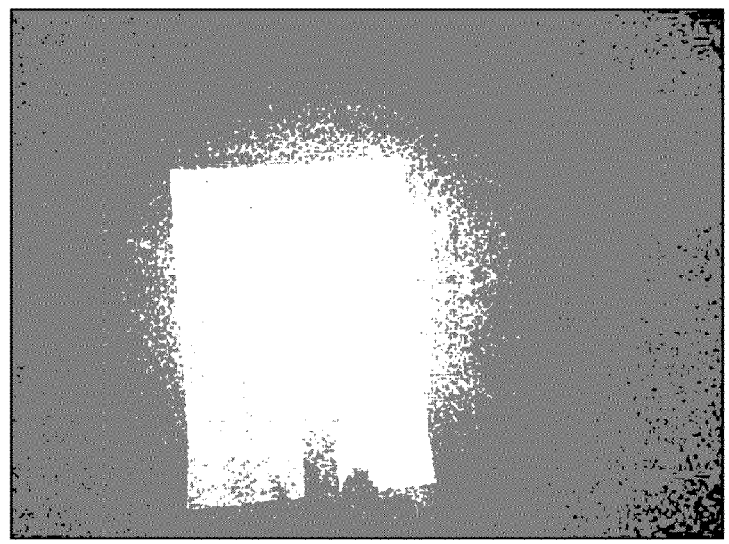
FIG. 1 shows an image of a frame of video data resulting from raw data being compressed and shown in greyscale, in which laser dazzle due to a blue laser is evident.
Figure 2:
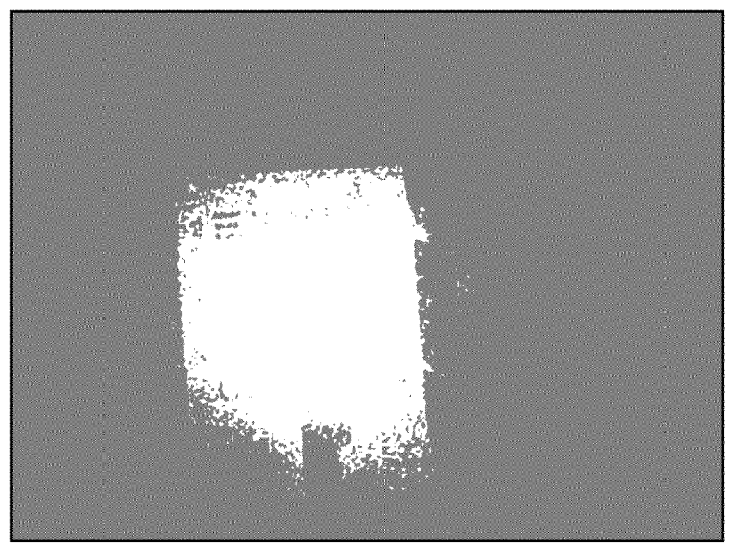
FIG. 2 shows an image of a frame of video data of the same scene, resulting from raw data being compressed, the blue channel being removed (zeroed out), and then being converted to greyscale.
Figure 3:
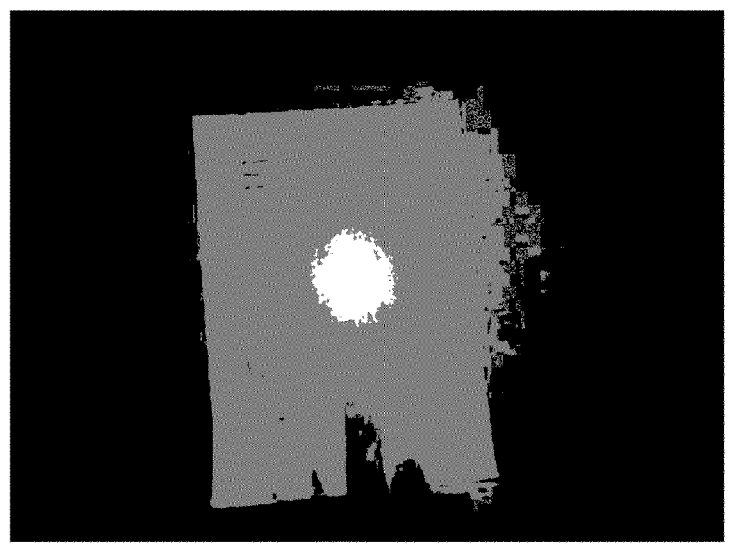
FIG. 3 shows an image of a frame of video data of the same scene, resulting the blue channel of raw data being removed (zeroed out), the resulting video data being compressed, then being converted to greyscale.

Turning to FIGS. 1, 2 and 3, three images are shown which are frames of video data collected of the same scene in which objects are visible but a blue laser is causing laser dazzle which causes reduction in image quality compared to if no laser was present. The only reason that the three figures are shown in greyscale is that this is a requirement of illustrations in patent applications.

In FIG. 1 the raw data has simply been compressed in a conventional way, the reduction in image quality is extreme.

In FIG. 2 the blue channel has been removed (zeroed out) after compressed video data was collected from the video camera module. Despite removal of the most strongly dazzled colour channel, the image exhibits strong reduction in image quality.

In FIG. 3, in the software environment, with the blue channel zeroed out, a conventional compression algorithm was applied. As can be seen the image quality is higher in FIG. 3 compared to FIG. 2.

Turning to FIG. 4, an embodiment of the present invention is illustrated. Three main possibilities are illustrated:
1. All the features including detector 5, being comprised in a video camera module 2;
2. All the features including detector 5' (dashed line) being comprised in a video camera 1 (dashed line); or
3. A video camera 1 which receives dazzle detection information from an external dazzle detector 5".

FIG. 4 shows a video camera module 2 comprising an image sensor 3 and a computer processor 4. The image sensor is behind a lens (not labelled) which directs light onto the image sensor 3.

Additionally a detector 5, 5' or 5" is shown in three possible locations in a box with dashed outline. If the detector is outside the video camera module 2 it may be part of a wider video camera 1 (shown with dashed outline) as detector 5', or alternatively the detector might be outside of the video camera 1 as a separate unit, detector 5".

Finally, whilst the pre-processing and compression are preferably performed by computer processor 4 within the video camera module 2, some or all processes may be performed by optional additional computer processor 6 (shown with dashed outline). Generally there may be multiple computer processors chips 4, 6 which to the extent that they share the pre-processing operations and/or post processing compression are to be considered as jointly providing the computer processor.

The video camera module or video camera operates as follows. Under normal conditions (in conditions which do not indicate that dazzle is present) the camera/module operates conventionally, and the raw data from the image sensor is compressed to provide compressed video data. In the case of laser dazzle that is specific to one or two of the RGB colour channels the video camera/module operates in an anti-dazzle mode. Detection of laser dazzle is possible in many ways although generally conditions indicating the presence of laser dazzle are detected, as opposed to detecting with certainty that the dazzle is caused by a laser.

Upon detection of dazzle in one or two RGB channels (and whilst this continues to be detected), the camera operates in anti-dazzle mode. This involves decreasing the image (pixel) values in the dazzled channel(s), prior to compressing the video data. This is preferably done within the video camera module.

The amount and method of decreasing the values in the dazzled channel(s) is up to the user, but typically a reduction of at least 50%, typically at least 75% is desirable across the field of view, and almost always would be at least a 10% reduction. A reduction of at least 90% is desirable in the close vicinity of the centre of the laser dazzle spot, however, since this needs to be done in real time and preferably on the camera module video chip, it may not be feasible to do anything other than a flat percentage reduction across the field of view.

One simple approach to reducing the values in the dazzled channel, is to reduce them all to either zero or to any other notional value (such as for example the mean or median value in the non-dazzled channels), across the field of view. Whilst this changes the colour of the picture, which is not desirable, it maximizes the clarity with which details visible in the other channels will be expressed in the compressed video data. An additional or alternative option is to reduce the values overall (i.e. on average across the frame) whilst preserving high spatial frequency variations, i.e. by applying a spatial band pass filter.

A more advanced and advantageous approach would be for the computer processor to be adapted to determine the spatial variation in the pixels in the dazzled channel and apply an optionally weighted reduction, whereby the amount that the dazzled channels values are reduced is advantageously higher in areas where a local average of the dazzled channel values is higher, and lower in areas where a local average of the dazzled channel values is lower. In the case of reducing the pixels values to below a certain threshold (for example to below 10% their initial value), it is advantageous to estimate their pixel value based upon the neighbouring non-dazzled channels. The advantage is that this improves the spatial resolution and promotes the visibility in non-dazzled channels, which can result in a clearer image.

Accordingly when there is no laser dazzle the camera operates optimally, and when dazzle is present in one or two colour channels, the camera performs better than a conventional camera.

More generally, there is provided a video camera or video camera module, comprising an RGB image sensor, a computer processor adapted to perform pre-processing followed by video compression, and a dazzle detector, characterised in responding to dazzle in one colour channel by reducing values in that colour channel prior to compressing the video data. This has the advantage that in the event of laser dazzle that is specific to a colour channel, the compressed video data generated will retain more detail from the other colour channels compared to a conventional camera.

Further embodiments are set out in the claims.

The invention claimed is:

1. A video camera or video camera module, having a field of view, comprising:
   a single chip image sensor including a red, green, and blue (RGB) Bayer filter, arranged to generate raw RGB video data;
   a computer processor adapted to perform image processing on the raw RGB video data, comprising at least one pre-processing operation, followed by a post processing compression operation to generate compressed video data;
   a detector adapted to determine an excess amount of light in at least one RGB colour channel as compared to other RGB colour channel(s), the excess amount of light associated with dazzle consistent with a laser, in at least part of the field of view of the video camera or video camera module, and to output to the computer processor a determination of at least one specified RGB colour channel as including the excess amount of light, wherein the determination is either based on video data from the RGB sensor or based on data from a light spectrum sensor or laser detector;
   wherein the computer processor is adapted to respond to the determination of an excess amount of light in the at least one specified RGB colour channel by reducing values of the specified RGB colour channel(s) as the part of the at least one pre-processing operation in advance of the post processing compression operation.

2. The video camera or video camera module of claim 1, wherein the detector is adapted to determine the excess amount of light in one RGB colour channel as compared to the other two RGB colour channels, and adapted to determine an excess of light in two RGB colour channels compared to the other one.

3. The video camera or video camera module of "claim 1," wherein the detector is adapted to determine the excess amount of light based on video data from the image sensor.

4. The video camera or video camera module of claim 1 wherein in reducing values of the specified RGB colour channel(s) as part of the at least one pre-processing operation, the computer processor is adapted to reduce the values by at least 50% of their original values on average (mean) across at least part of the field of view of the video camera or video camera module.

5. The video camera or video camera module of claim 1, wherein in reducing values of the specified RGB colour channel(s) as part of the at least one pre-processing operation, the computer processor is adapted to reduce each value by at least 75% of their original value, across at least part of the field of view of the video camera.

6. The video camera or video camera module of "claim 1," wherein in reducing values of the specified RGB colour channel(s) as part of the at least one pre-processing step, the computer processor is adapted to apply a high frequency band pass filter to the specified RGB colour channels, across at least part of the field of view of the video camera or video camera module.

7. The video camera or video camera module of "claim 1," wherein the Bayer filter provides an optical density of at least OD4.

8. The video camera or video camera module of claim 1, wherein:
   the detector is adapted to identify a part of the field of view of the camera in which there is an excess amount of light in at least on one RGB colour channel as compared to the other RGB colour channel(s) as a result of laser dazzle as a result of at least one type of laser, and to output to the computer processor an indication of the identified part of the field of view, and;
   in reducing values of the specified RGB colour channel(s) as part of the at least one pre-processing step the computer processor is adapted to reduce values of the specified RGB colour channel(s) preferentially in the indicated part of the field of view.

9. The video camera or video camera module of claim 1, wherein the computer processor is adapted to determine high spatial frequency variations in pixel values in at least one of the dazzled colour channel(s) and to add the high spatial frequency variations to the dazzled channel(s) and reduce average values of the dazzled channel(s).

\* \* \* \* \*